(12) United States Patent
Wu

(10) Patent No.: US 7,801,148 B2
(45) Date of Patent: *Sep. 21, 2010

(54) METHOD AND DEVICE FOR SUPPORTING ACCESS OF POINT TO POINT PROTOCOL OVER ATM TERMINAL

(75) Inventor: Haijun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

This patent is subject to a terminal disclaimer.

(21) Appl. No.: 11/567,317

(22) Filed: Dec. 6, 2006

(65) Prior Publication Data

US 2007/0133558 A1      Jun. 14, 2007

Related U.S. Application Data

(63) Continuation of application No. PCT/CN2005/001085, filed on Jul. 20, 2005.

(30) Foreign Application Priority Data

Jul. 20, 2004    (CN)    ......................... 2004 1 0069585

(51) Int. Cl.
H04L 12/28    (2006.01)
(52) U.S. Cl. ..................... 370/395.2; 370/466
(58) Field of Classification Search .............. 370/464, 370/465, 466, 351, 389, 395.1, 396, 395.5, 370/395.53, 431, 432, 395.52, 395.2; 379/142.01, 379/142.16
See application file for complete search history.

(56) References Cited

U.S. PATENT DOCUMENTS 6,301,229 B1 * 10/2001 Araujo et al. ............... 370/252

(Continued)

FOREIGN PATENT DOCUMENTS

CN        1274220 A    11/2000

(Continued)

OTHER PUBLICATIONS

DSL Forum: Migration to Ethernet Based DSL Aggregation, May 2004 http://www.ieee802.org/1/files/public/docs2004/WT-101v1.pdf.

(Continued)

*Primary Examiner*—Kwang B Yao
*Assistant Examiner*—Obaidul Huq
(74) *Attorney, Agent, or Firm*—Leydig, Voit & Mayer, Ltd.

(57) ABSTRACT

A method for supporting access of a Point to Point Protocol over Asynchronous Transfer Mode (PPPoA) terminal including: the PPPoA terminal initiates a Point to Point Protocol (PPP) negotiation to a broadband access device based on an Internet Protocol (IP) architecture; the broadband access device assigns a Media Access Control (MAC) address to the PPPoA terminal, builds a Point to Point Protocol over Ethernet (PPPoE) connection between itself and a Broadband Access Server (BAS) and acquires a Session ID; the broadband access device converts a PPPoA packet sent by the PPPoA terminal into a PPPoE packet and sends the PPPoE packet to the BAS according to the MAC address and Session ID, and converts the PPPoE packet sent by the BAS into the PPPoA packet and sends the PPPoA packet to the PPPoA terminal. A device for supporting the access of a PPPoA terminal is provided.

17 Claims, 4 Drawing Sheets

U.S. PATENT DOCUMENTS

| | | | |
|---|---|---|---|
| 6,711,162 B1 * | 3/2004 | Ortega et al. | 370/389 |
| 6,801,496 B1 * | 10/2004 | Saleh et al. | 370/221 |
| 7,136,386 B2 * | 11/2006 | Allen et al. | 370/395.5 |
| 7,489,693 B2 | 2/2009 | Xu | |
| 7,590,148 B2 * | 9/2009 | Wu | 370/466 |
| 2003/0061321 A1 | 3/2003 | Roh | |
| 2003/0182434 A1 * | 9/2003 | Ogushi et al. | 709/228 |
| 2004/0044789 A1 * | 3/2004 | Angel et al. | 709/238 |
| 2004/0071133 A1 | 4/2004 | Yusko et al. | |
| 2004/0090970 A1 * | 5/2004 | Sanchez et al. | 370/397 |
| 2004/0105444 A1 | 6/2004 | Korotin et al. | |
| 2005/0100041 A1 | 5/2005 | You | |
| 2006/0182103 A1 * | 8/2006 | Martini et al. | 370/389 |
| 2007/0133558 A1 | 6/2007 | Wu | |
| 2009/0109976 A1 | 4/2009 | Wu | |

FOREIGN PATENT DOCUMENTS

| | | | |
|---|---|---|---|
| CN | 1404265 A | 3/2003 | |
| CN | 1507226 A | 6/2004 | |
| CN | 1309233 C | 4/2007 | |
| JP | 2000307587 A | 11/2000 | |
| KR | 2003-0044284 A | 6/2003 | |
| WO | WO 02/076027 A1 | 9/2002 | |
| WO | WO 03/077146 A1 | 9/2003 | |

OTHER PUBLICATIONS

Neogi et al., *IEEE Network*, 17(4): 56-62 (2003).

Andersen, "Comments on WT-092 Revision 1," DSLForum2003.298 (Aug. 26, 2003).

European Patent Office, Examination Report in European Patent Application No. 05774415.3 (May 9, 2008).

IEEE, "IEEE Standard for Local and Metropolitan Area Networks: Overview and Architecture," IEEE Standard 802-2001 (Feb. 7, 2002).

Mickelsson, "ATM Versus Ethernet," http://www.tml.tkk.fi/Opinnot/Tik110.551/1999/papers/07ATMvsEthernet/iworkpaper.html (May 18, 1999).

State Intellectual Property Office of the People's Republic of China, Written Opinion of the International Searching Authority in International Patent Application No. PCT/CN2005/001085 (Nov. 10, 2005).

Telefonaktiebolaget L. M. Ericsson, Brief in Opposition to the Grant of European Patent No. 1750398-B1 (Nov. 11, 2009).

U.S. Patent & Trademark Office, File History of U.S. Patent No. 7,590,148.

* cited by examiner

METHOD AND DEVICE FOR SUPPORTING ACCESS OF POINT TO POINT PROTOCOL OVER ATM TERMINAL

This application is a continuation of International Patent Application No. PCT/CN2005/001085, filed Jul. 20, 2005, which claims priority to Chinese Patent Application No. 200410069585.9, filed Jul. 20, 2004, all of which are hereby incorporated by reference.

FIELD OF THE TECHNOLOGY

The present invention relates to access technologies in communication networks, and more particularly, to a method and device for supporting access of Point to Point Protocol over an Asynchronous Transfer Mode (ATM) terminal.

BACKGROUND OF THE INVENTION

In broadband access networks, besides a Point to Point Protocol over Ethernet (PPPoE) mode based on Ethernet, a Virtual Local Area Network (VLAN) mode and an 802.1 x authentication mode which are very popular at present, a Point to Point Protocol over ATM (PPPoA) mode has been used all along. In the PPPoA access mode, a Point to Point Protocol (PPP) call is initiated by a PPPoA terminal, and a series of PPP access procedures, such as authorization, authentication, Internet Protocol (IP) address assignment and charging, are performed by an ATM Broadband Access Server (BAS). As shown in FIG. 1, the specific steps are as follows:

Step 101: A PPPoA terminal initiates a PPP negotiation to the ATM BAS device, the PPPoA terminal performs a PPP Link Control Protocol (LCP) negotiation with the ATM BAS device to configure and test data links. The PPPoA packet is terminated in the ATM BAS device. The ATM BAS device controls the LCP negotiation procedure, analyzes the PPPoA packet and responds to the PPPoA terminal to complete the LCP negotiation procedure. The controlling methods of negotiation procedures described hereinafter are the same.

Step 102: Based on the result of the LCP negotiation, whether to adopt a Password Authentication Protocol (PAP) or a Challenge-Handshake Authentication Protocol (CHAP) in the authentication procedure is determined. After the LCP negotiation, the PAP or the CHAP authentication procedure starts.

Step 103: After the authentication procedure and the PPPoA terminal passes the authentication, a link is built. The PPPoA terminal performs a PPP Network Control Protocol (NCP) negotiation with the ATM BAS device to choose and configure one or more network layer protocols, and to get authorization instruction of the PPPoA terminal. Then the PPP negotiation is completed. At the same time, the ATM BAS device starts charging for the PPPoA terminal.

Step 104~Step 105: The PPPoA terminal accesses the Internet, meanwhile, the ATM BAS device terminates the PPPoA packets sent by the PPPoA terminal, that is, removes the protocol headers of the PPPoA packets, extracts the data from the PPPoA packets, and sends the data to the Internet. The extracted data from the PPPoA packets by the ATM BAS device are the specific data contents sent by the PPPoA terminal to the Internet.

Step 106: The PPPoA terminal logs off and notifies the ATM BAS device, the ATM BAS device stops charging for the PPPoA terminal and terminates the access to the Internet of the PPPoA terminal.

The Ethernet achieves a great success by equally super fast transmission rate and lower networking cost than the ATM along with development of the Ethernet technology. ATM Digital Subscriber Line Access Multiplexer (DSLAM) devices start to convert to IP DSLAM devices, and the IP DSLAM devices with more and more powerful functions are adopted in network upgrading.

There are mainly two forms in the existing DSLAM access devices: an ATM DSLAM and an IP DSLAM, where the ATM DSLAM device is a broadband access device whose core is an ATM switch while the IP DSLAM device is a broadband access device whose core is a switch based on the combination of VLAN and Media Access Control (MAC). Broadband access devices can be classified into two categories, that is, frame type and box type, in terms of the device forms, and as shown in FIG. 2, devices of both categories include four components: a main control functional module, a switching functional module, a subscriber interface functional module and a backplane functional module. The subscriber interface functional module is used for providing access interfaces for subscribers, and different subscriber interface functional modules can provide different access methods such as an Asymmetric Digital Subscriber Line (ADSL), a Very High Data Rate Digital Subscriber Line (VDSL), an Ethernet, and a Symmetric High Data Rate Digital Subscriber Line (G.SHDSL). Typically, one broadband access device can provide multiple subscriber interface functional modules, and the subscriber interface functional modules are numbered by a slot number, starting from 0 or 1. Multiple line interfaces for subscriber to access such as 16, 24, or 48 interfaces can be provided in one subscriber interface functional module, and these interfaces are numbered uniformly, starting from 0 or 1. The main control functional module is used for implementing control and administration functions of the broadband access device. The switching functional module is used for implementing traffic converting and processing functions of the whole broadband access device, and for implementing an interface of the network side. The backplane functional module is used for providing connection and communication functions for the above functional modules.

The broadband access device based on the ATM core is one generation of current mainstream type of access device. The broadband access device adopts a switching structure of ATM, that is, both data communication between the subscriber interface functional module and the main control functional module, and the data communication between the subscriber interface functional module and the switching functional module use the ATM bearer, adopting a shared cell bus or an ATM bus interface. At the same time, the switching subsystem is also based on switches of the ATM cells. As shown in FIG. 3A, the specific service procedure is as follows: service data are transmitted from the subscriber interface functional module to the switching functional module by an ATM Virtual Channel (VC) bearer and the cell based bus of the backplane functional module, the switching functional module forwards the service data using a cell based switching method, that is, performs a Virtual Path Identifier (VPI)/Virtual Channel Identifier (VCI) conversion of the ATM VC header, and outputs the service data to a corresponding output port.

Because the ATM technology has stopped developing, the ATM interface bandwidth of mainstream applications has stops at the level of STM-1, 155 Mbps, the bandwidth capacity of STM-4, 622 Mbps and the bandwidth capacity of STM-16, 2.5 Gbps have not been used commercially because of too high interface costs. Meanwhile, demands for the network bandwidth increasingly rise with development of various network services, and the ATM switching network has been unable to meet the demands for larger bandwidth. Mainstream services in networks are now using the IP bearer while the ATM is based on a connection mode. Therefore, the ATM cannot effectively perceive the multiple services on the IP bearer, and thus, cannot effectively guarantee the quality of multiple services. When it comes with an IP Television (IPTV) service, which is a multicast video service of mainstream applications, because of the technical characteristic of a point to point connection of the ATM, configuration and maintenance administration for such a point to multiple points service is rather complex, thus, no commercial network can be built effectively, which makes it impossible to support the development of such mainstream services with the ATM.

As the bandwidth of the ATM core based broadband access device is small, an Ethernet/IP core based broadband access device, which is relatively a new broadband access device at present, is proposed. Because an Ethernet Layer 2(L2)/Layer 3(L3) based switching structure is adopted by an IP broadband access device, a larger switching capability such as 10 Gbps—48 Gbps or even larger can be provided, and also an interface bandwidth of Fast Ethernet (FE)/Gigabit Ethernet (GE), even 10 GE, can be provided. Thus, the bottleneck of bandwidth is resolved. Both the data communication between the subscriber interface functional module and the main control functional module and the data communication between the subscriber interface functional module and the switching functional module are born by the Ethernet, and an FE or a GE connection can be adopted between the subscriber interface functional module and the main control functional module while the switching functional module witches based on the Ethernet. As shown in FIG. 3B, the specific service procedure is as follows:

a service accessed by the subscriber interface functional module is carried by the ATM VC bearer or the Ethernet bearer, and the subscriber interface functional module reorganizes and restores the ATM cells to an Ethernet packet, adds an 802.1Q based VLAN identifier to the Ethernet packet, and then transmits it to the switching functional module by an Ethernet based FE/GE star style bus of the backplane functional module. Then, the switching system forwards the service data based on a switching method combining the VLAN and the MAC addresses or based on the IP addresses, and outputs the service data to a corresponding output port.

Thus, how to support a PPPoA based access method on the IP DSLAM device becomes an urgent problem to be solved.

SUMMARY OF THE INVENTION

A method for supporting the access of a Point to Point Protocol over Asynchronous Transfer Mode (PPPoA) terminal is provided by the present invention, and a device for supporting the access of a PPPoA terminal is also provided.

The method provided by the invention for supporting access of a PPPoA terminal to a broadband access device which is based on the IP architecture includes the following steps:

assigning, by the broadband access device, a Media Access Control (MAC) address to the PPPoA terminal;

setting up a Point to Point Protocol over Ethernet (PPPoE) connection between the broadband access device and a Broadband Access Server (BAS), and acquiring, by the broadband access device, a Session ID assigned by the BAS;

converting, by the broadband access device, a PPPoA packet sent by the PPPoA terminal into a PPPoE packet and sending the PPPoE packet to the BAS, and converting, by the broadband access device, the PPPoE packet sent by the BAS into the PPPoA packet and sending the PPPoA packet to the PPPoA terminal according to the MAC address and the Session ID.

A device for supporting access of a Point to Point Protocol over Asynchronous Transfer Mode (PPPoA) terminal, including a main control functional module, a switching functional module, a subscriber interface functional module and a backplane functional module, and a conversion functional module, used for converting a PPPoA packet sent by the PPPoA terminal into a Point to Point Protocol over Ethernet (PPPoE) packet and sending the PPPoE packet to an Ethernet BAS device, as well as converting the PPPoE packet sent by an Ethernet Broadband Access Server (BAS) device into the PPPoA packet and sending the PPPoA packet to a PPPoA terminal.

An accessing system for supporting a Point to Point Protocol over Asynchronous Transfer Mode (PPPoA) terminal, includes an Internet Protocol (IP) architecture based broadband access device and a Broadband Access Server (BAS);

the broadband access device is used for assigning a Media Access Control (MAC) address to a PPPoA terminal, setting up a Point to Point Protocol over Ethernet (PPPoE) connection between the BAS and itself, converting a PPPoA packet sent by the PPPoA terminal into a PPPoE packet and sending the converted PPPoE packet to the BAS, and converting a PPPoE packet sent by the BAS into a PPPoA packet and sending the PPPoA packet to the PPPoA terminal, according to the MAC address and a session ID;

the BAS is used for assigning the session ID to the broadband access device.

According to embodiments of the present invention, a broadband access device such as an IP DSLAM device is able to convert PPPoA packets and PPPoE packets into each other, which enables a PPPoA terminal to access a broadband network via an IP architecture based broadband access device, that is, access the broadband network via a broadband access device in the Ethernet mode, and enables the broadband access device to cooperate with a standard BAS such as an Ethernet BAS device without special processing and to be connected to all BAS conveniently. Additionally, abnormal logoff of a PPPoA terminal could be detected with an effective method in the implementing procedure in accordance with an embodiment of the present invention, which guarantees the inter-working capability of the protocol. Therefore, accesses of PPPoA terminal can be supported well in a broadband access device and network resources can be saved efficiently. Thus, in accordance with embodiments of the present invention, the compatibility of the network for existing ATM network subscribers is extended and the work in network reconstruction by operators is reduced.

Furthermore, the MAC address resources can be saved efficiently by managing the MAC addresses of PPPoA terminals dynamically by the broadband access device.

DETAILED DESCRIPTION OF THE INVENTION

Because the IP DSLAM device mainly supports the PPPoE access method and the core of the IP DSLAM adopts an Ethernet based switching core, existing PPPoA terminals cannot access a broadband network via an IP DSLAM device. However, operators do not want to change the using habits and terminal software of the subscribers. Furthermore, such changes not only need a great deal of work, but also generate a high cost. As a result, a fixed mapping method is proposed, in which the PPPoA packets are converted into the PPPoE packets, enabling the PPPoA terminal to access the broadband network by the IP DSLAM device. However, the fixed mapping method has a special requirement on the Ethernet BAS device, that is, requiring that the Ethernet HAS device make a special processing of the PPPoE packets converted from the PPPoA packets. Furthermore, the Ethernet BAS device will enter the Session stage directly without building a PPPoE Discovery stage.

The invention is hereinafter described in detail with reference to the embodiments and the accompanying drawings.

In the embodiments of the present invention, PPPoA packets and PPPoE packets are converted into each other in the broadband access device, that is, an IP DSLAM device, so as to enable a PPPoA terminal to access a broadband network via the IP DSLAM device.

Figure 1:
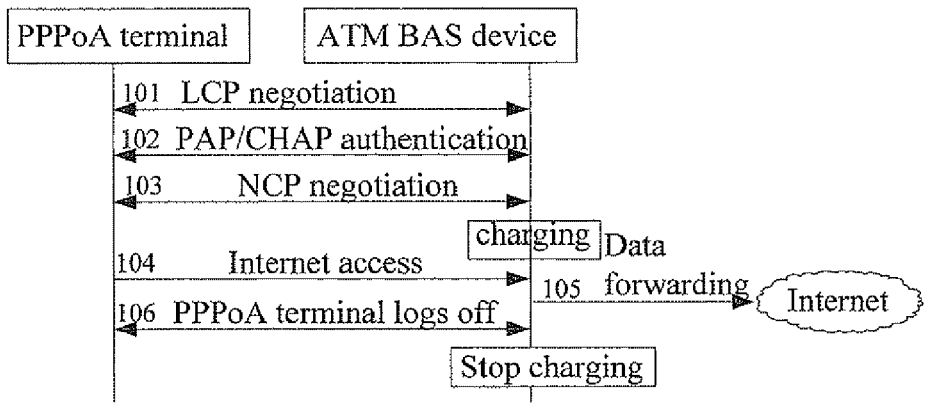
FIG. 1 shows a flow chart of a PPPoA terminal accessing a broadband network in the prior art.
Figure 2:
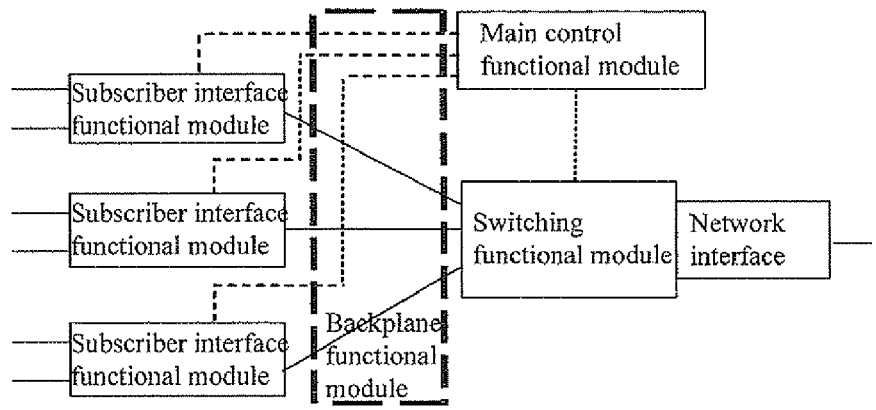
FIG. 2 shows a schematic diagram of the structure of an existing broadband access device.
Figure 3A:
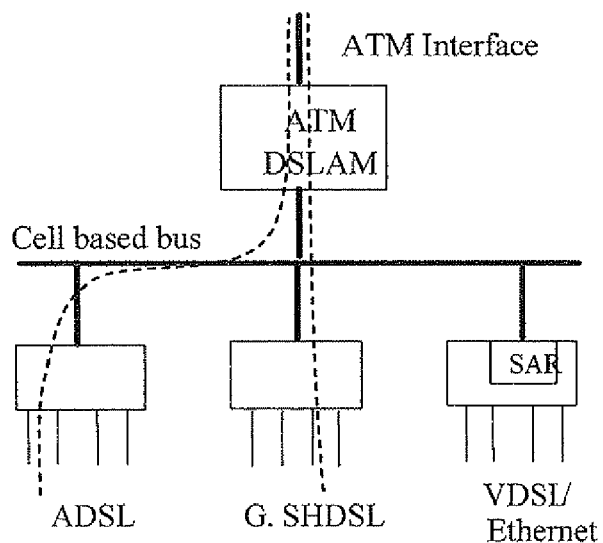
FIG. 3A shows a schematic diagram of data transmission in an ATM DSLAM device.
Figure 3B:
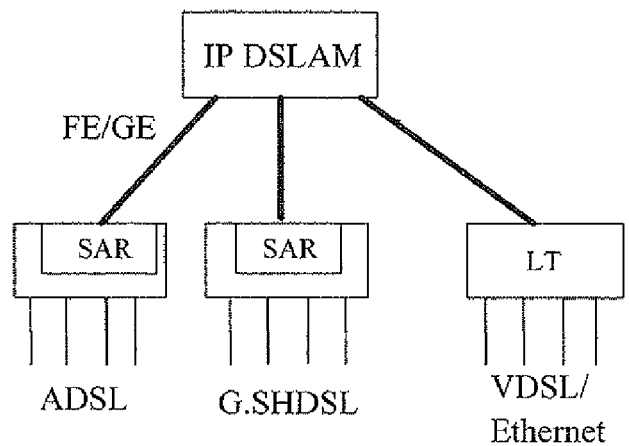
FIG. 3B shows a schematic diagram of data transmission in an IP DSLAM device.
Figure 4:
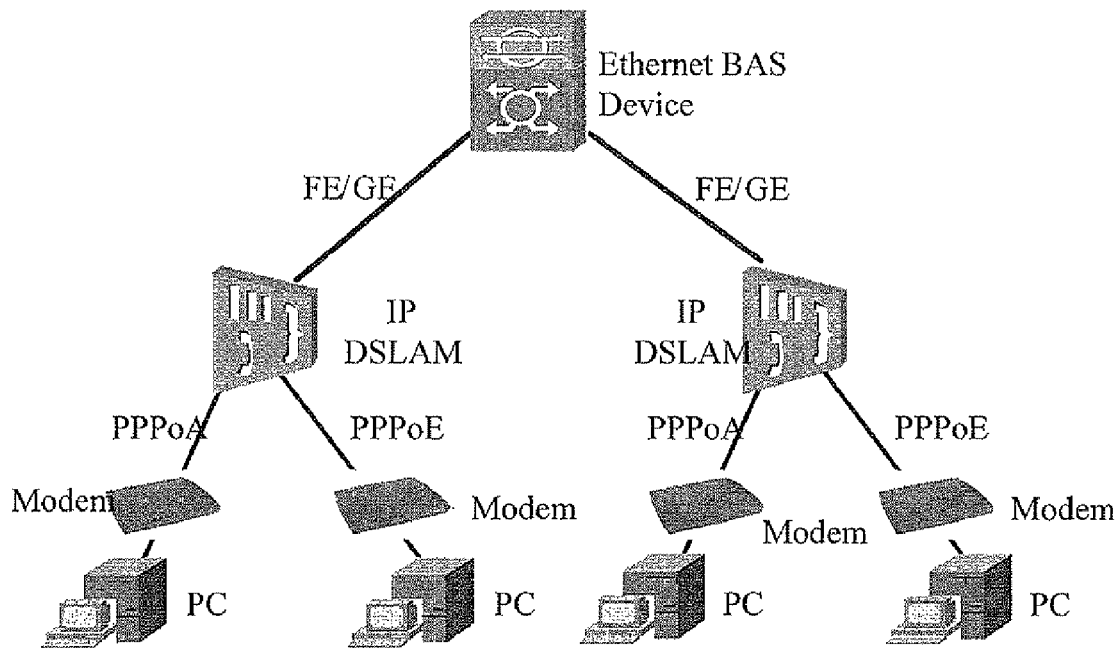
FIG. 4 shows a schematic diagram of networking that supports both the PPPoA terminals and the PPPoE terminals on an IP DSLAM device in accordance with an embodiment of the present invention.

FIG. 4 shows a schematic diagram of networking that supports the PPPoA terminals and the PPPoE terminals on an IP DSLAM device in accordance with an embodiment of the present invention. As shown in FIG. 4, terminals (that is, PCs shown in the Figure) access a BAS device (that is, the Ethernet BAS device shown in the Figure) via broadband access devices (that is, the IP DSLAM devices shown in the Figure). The terminals that access the broadband network via the IP DSLAM devices include the PPPoA terminals and the PPPoE terminals.

Packets between the PPPoA terminals and the IP DSLAM devices adopt the encapsulating format of an ATM cell while packets between the IP DSLAM devices and the Ethernet HAS devices adopt the encapsulating format of the PPPoE. A MAC address pool, which is used for the PPPoA terminals, is configured for the PPPoA terminals in the IP DSLAM devices in advance, and the IP DSLAM device assigns dynamically or specifies statically a MAC address for a PPPoA terminal from the MAC address pool. The IP DSLAM device distinguishes a PPPoA terminal from a PPPoE terminal by the MAC address pool configured in advance, that is, if the MAC address of a terminal is a MAC address in the MAC address pool configured in advance, the terminal is a PPPoA terminal; if the MAC address of a terminal is not in the MAC address pool configured in advance, the terminal is a PPPoE terminal. When the IP DSLAM device assigns a MAC address to a PPPoA terminal, it may assign different MAC addresses to different PPPoA terminals, that is, one MAC address corresponds to one PPPoA terminal; or the IP DSLAM device may assign one MAC address to multiple PPPoA terminals, that is, one MAC address corresponds to multiple PPPoA terminals.

Figure 5:
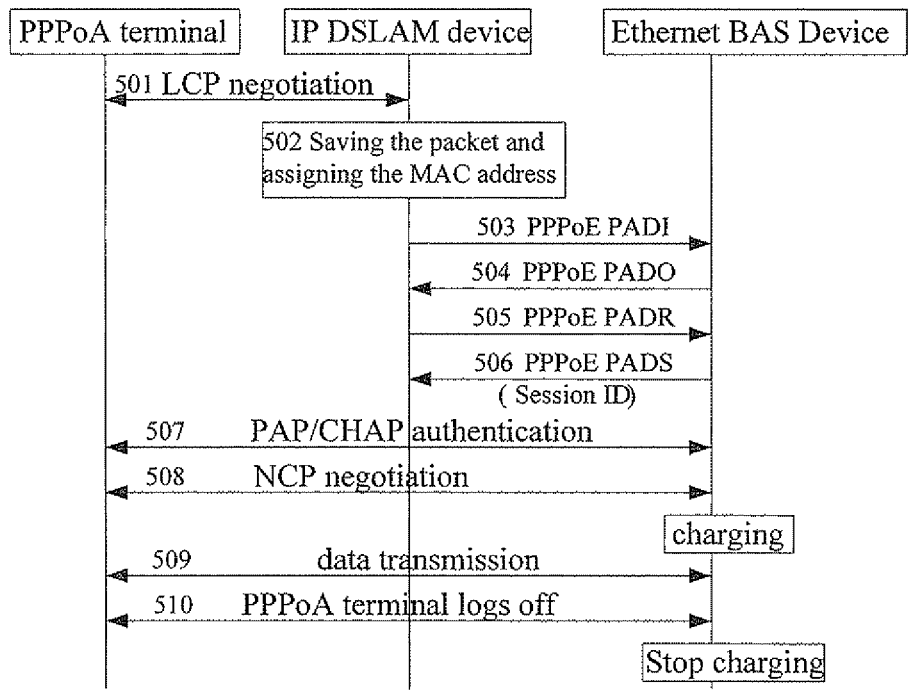
FIG. 5 shows a flow chart of a PPPoA terminal accessing a broadband network via an IP DSLAM device in accordance with an embodiment of the present invention.

FIG. 5 shows a flow chart of a PPPoA terminal accessing a broadband network by an IP DSLAM device in accordance with an embodiment of the present invention. As shown in FIG. 5, the procedure of a PPPoA terminal accessing the broadband network via an IP DSLAM device includes the following steps:

Step 501; the PPPoA terminal initiates a PPP negotiation to the IP DSLAM device when the IP DSLAM device detects that the packet sent by the PPPoA terminal is a PPPoA packet.

Step 502: the IP DSLAM device saves the PPPoA LCP packet sent by the PPPoA terminal and assigns a MAC address to the PPPoA terminal from the MAC address pool configured in advance. The IP DSLAM device may assign the MAC address to the PPPoA terminal by using a static fixed assigning method; or assign the MAC address to the PPPoA terminal by using a dynamic method such as assigning in turn.

Step 503 to Step 504; the IP DSLAM device starts a PPPoA session procedure between itself and the Ethernet BAS device and sends a PPPoE Active Discovery Initiation (PADI) packet carrying the MAC address of the PPPoA terminal to the Ethernet BAS device; upon receiving the PADI packet, the Ethernet BAS device returns a PPPoE Active Discovery Offer (PADO) packet to the IP DSLAM device.

Step 505 to Step 506: upon receiving the PADO packet, the IP DSLAM device sends a PPPoE Active Discovery Request (PADR) packet to the Ethernet BAS device; upon receiving the PADR packet, the Ethernet BAS device assigns a Session ID for the current session and returns a PPPoE Active Discovery Session-confirmation (PADS) packet carrying the Session ID to the IP DSLAM device. Thus, a session connection between the IP DSLAM device and the Ethernet BAS device is built.

Step 507: the IP DSLAM device sends the saved PPP LCP packet to the Ethernet BAS device by the PPPoE session, so as to complete the LCP negotiation stage between the PPPoA client and the BAS device to set and test the data link. The PPPoA terminal performs the PAP or the CHAP authentication procedure with the Ethernet BAS device, and whether to adopt the PAP or the CHAP in the authentication procedure depends on the result of the LCP negotiation.

Step 508: When the authentication procedure ends and the PPPoA terminal passes the authentication, a link is built. The PPPoA terminal performs a PPP NCP negotiation stage with the Ethernet BAS device to choose and set one or more network layer protocols, and to get the authorization information of the PPPoA terminal. The PPP negotiation is completed, and at the same time, the Ethernet BAS device starts charging for the PPPoA terminal.

According to the above procedures, a PPP connection between the PPPoA terminal and the Ethernet BAS device is built and a PPPoE connection between the IP DSLAM device and the Ethernet BAS device is built. The IP DSLAM device is used for taking charge of the bottom layer transmission connection of the PPP connection between the PPPoA terminal and the Ethernet BAS device, that is, the IP DSLAM device converts the PPPoA packets sent by the PPPoA terminal into the PPPoE packets and sends the PPPoE packets to the Ethernet BAS device, and converts the PPPoE packets sent by the Ethernet BAS device into the PPPoA packets and sends the PPPoA packets to the PPPoA terminal.

Step 509: the PPPoA terminal accesses the broadband network, and transmits data between itself and the Ethernet BAS device through the IP DSLAM device, that is, the IP DSLAM device performs the data transmission after converting the uplink and the downlink packets according to the set Session ID and the MAC address assigned to the PPPoA terminal. Specifically, when the data are transmitted in the uplink direction, the IP DSLAM device converts the PPPoA packet sent by the PPPoA terminal into the PPPoE packet and sends the PPPoE packet to the Ethernet BAS device, upon receiving the PPPoE packet, the Ethernet BAS device terminates the PPPoE packet and analyzes the PPPoE packet to obtain the IP packet, and sends the IP packet to the broadband network; when the data are transmitted in the downlink direction, the IP DSLAM device receives the PPPoE packet sent by the Ethernet BAS device, and converts the PPPoE packet into the PPPoA packet and sends the PPPoA packet to the PPPoA terminal after determining that the terminal to receive the data is a PPPoA terminal according to the MAC address in the PPPoE packet.

When the data are transmitted in the downlink direction, the IP DSLAM device determines whether the terminal is a PPPoA terminal or a PPPoE terminal according to the MAC address in the PPPoE packet sent by the Ethernet BAS device.

If the terminal is a PPPoA terminal, the IP DSLAM device converts the PPPoE packet into the PPPoA packet according to the destination MAC address and the Session ID in the PPPoE packet, and sends the PPPoA packet to the specified PPPoA terminal. If the terminal is a PPPoE terminal, the IP DSLAM device sends the PPPoE packet to the PPPoE terminal directly.

If the IP DSLAM device assigns different MAC addresses to different PPPoA terminals, the different PPPoA terminals can be distinguished by the MAC addresses, and the IP DSLAM device sends the converted PPPoA packets to the PPPoA terminal corresponding to the MAC address when the data are transmitted in the downlink direction, if the IP DSLAM device assigns the same MAC address to different PPPoA terminals, the different PPPoA terminals can be distinguished by combination of the MAC address and the Session ID, and the IP DSLAM device sends the converted PPPoA packet to the PPPoA terminal corresponding to the MAC address and the Session ID when the data are transmitted in the downlink direction Step 510: the PPPoA terminal logs off and notifies the Ethernet BAS device, the Ethernet BAS device stops charging for the PPPoA terminal and terminates the accesses to the broadband network of the PPPoA terminal.

The specific data conversion procedure is as follows: when the data are transmitted in the uplink direction, that is, from a PPPoA terminal to the Ethernet BAS device, the packet conversion procedure performed by the IP DSLAM device after the IP DSLAM device receives a packet sent by the PPPoA terminal is mainly as follows:

(1) upon determining that the packet sent by the terminal is a PPPoA packet, the IP DSLAM device terminates the ATM connection and analyzes the PPPoA packet to get the PPP load, that is, the data to be transmitted;

(2) the IP DSLAM device generates a PPPoE packet header according to the related information such as the Session ID, length of the PPP load, and VLAN identifier. For example, the information in a PPPoE packet header may be filled in as follows: type of the Ethernet, filled in with x8864; version number of the PPPoE protocol, filled in with 0x1; type of the PPPoE protocol, filled in with 0x1; type of the PPPoE packet, filled in with 0x00 because what is encapsulated in the packet is a PPP packet; Session ID, filled in with the Session ID generated in Step 505 to Step 506; length of the session, filled in with the length of the PPP load in the PPPoA packet.

(3) the IP DSLAM device encapsulates the PPPoE packet header and the PPP load into a PPPoE packet, in which the destination MAC address is the MAC address of the Ethernet BAS device and the source MAC address is the MAC address assigned to the PPPoA terminal in Step 502, and sends the PPPoE packet to the Ethernet BAS device.

When the data are transmitted in the downlink direction, that is, from an Ethernet BAS device to a PPPoA terminal, the packet conversion procedure that is performed by the IP DSLAM device after the IP DSLAM device receives a packet sent by the Ethernet BAS device is mainly as follows:

(1) upon determining that the terminal is a PPPoA terminal according to the information such as the MAC address or the VLAN identifier, the IP DSLAM device regenerates the related information such as a Permanent Virtual Circuit (PVC), a port number and a slot number corresponding to the PPPoA terminal according to the related information such as the Session ID, the MAC address and the VLAN identifier in the PPPoE packet.

(2) the IP DSLAM device analyzes the PPPoE packet to get the PPP load, that is, the data to be transmitted;

(3) the IP DSLAM device encapsulates the PPP load and the related information to a PPPoA packet and sends the PPPoA packet to the PPPoA terminal.

Data communication between the PPPoA terminal and the broadband network via the IP DSLAM device is implemented according to the above described packet conversions that are performed by the IP DSLAM device when data are transmitted in the uplink and downlink directions.

Figure 6:
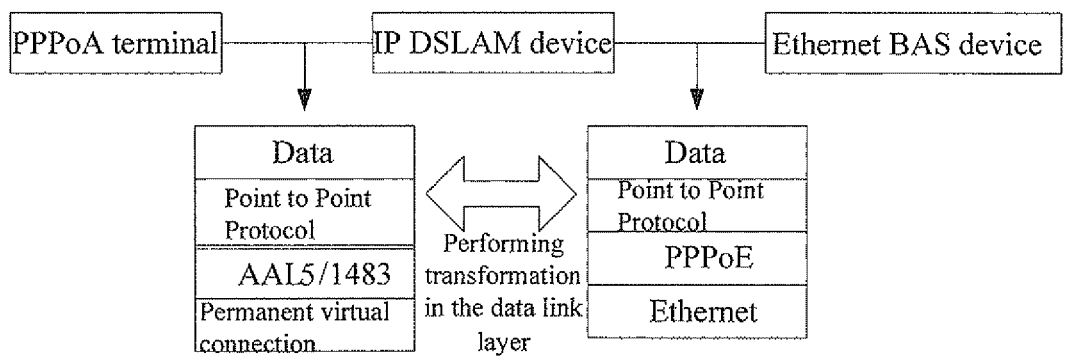
FIG. 6 shows a schematic diagram of converting data in the link layer in accordance with an embodiment of the present invention.

FIG. 6 shows a schematic diagram of converting data in the link layer in accordance with an embodiment of the present invention. As shown in FIG. 6, when data are transmitted in the uplink direction, after passing the IP DSLAM device, the bearer of PPP data changes from the PPPoA layer to the PPPoE layer; when data are transmitted in the downlink direction, after passing the IP DSLAM device, the bearer of PPP data changes from the PPPoE layer to the PPPoA layer.

In the implementing procedure of a PPPoA terminal accessing a broadband network by an IP DSLAM device in accordance with an embodiment of the present invention, a method is also proposed for detecting abnormal logoff of the PPPoA terminal, which makes it possible to effectively save the network resources.

Figure 7:
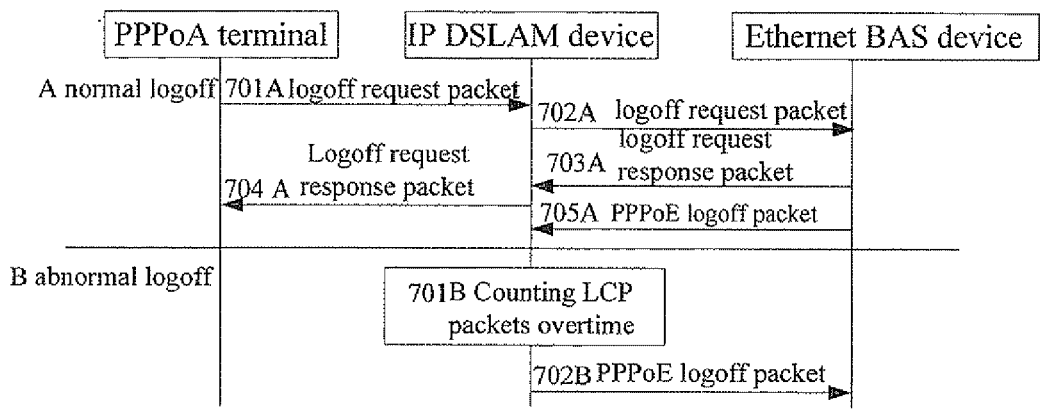
FIG. 7 shows a flow chart of processing the logoff of a PPPoA terminal in accordance with an embodiment of the present invention.

FIG. 7 shows the flow chart for processing the logoff of a PPPoA terminal in accordance with an embodiment of the present invention. As shown in FIG. 7, the procedure for processing a normal logoff of a PPPoA terminal includes the following steps:

Step 701A to Step 704A: the PPPoA terminal sends an LCP logoff request packet to the Ethernet BAS device when the PPPoA terminal logs off normally in the case such as not needing to access the broadband network any longer; the Ethernet BAS device removes the PPP connection between itself and the PPPoA terminal.

Step 705A: the Ethernet BAS device sends a PPPoE logoff packet to the IP DSLAM device to instruct the IP DSLAM device to remove the PPPoE connection between the IP DSLAM device and the Ethernet BAS device, the Ethernet BAS device stops charging for the PPPoA terminal, and removes the PPPoE connection between itself and the IP DSLAM device. Upon receiving the PPPoE logoff packet, the IP DSLAM device removes the PPPoE connection between itself and the Ethernet BAS device.

After the PPP connection between the Ethernet BAS device and the PPPoA terminal is built, the PPPoA terminal and the Ethernet BAS device keep sending LCP packets as keep alive packets to each other via the IP DSLAM device periodically, such as every 15 seconds. The IP DSLAM device transparent transmits the LCP packet without any processing of the LCP packet. According to the PPP protocol, the PPP connection between the Ethernet BAS device and the PPPoA terminal will be removed if there is no response after sending the LCP packet for three times. Therefore, after the connection between the Ethernet BAS device and the PPPoA terminal is built, the IP DSLAM device can keep counting the number of the LCP packets for maintaining the PPP link layer and detects periodically, such as every one minute, whether the number of the LCP packets periodically increases. If the number of the LCP packets periodically increases, it means that the connection between the PPPoA terminal and the IP DSLAM device is normal, the timer is to be restarted; otherwise, it means that a failure may occurs in the connection between the PPPoA terminal and the IP DSLAM device, the timer is restarted and detects whether the number of the LCP packets changes in the period. If the number of the LCP packets has been detected to be unchanged for n times, where n may be 2, 3, 4, and etc, the IP DSLAM device determines that the PPPoA terminal has logged off and the connection between itself and the PPPoA terminal has been removed. So the IP DSLAM device sends a request initiatively to the Ethernet BAS device to remove the PPPoE connection. Alternatively, a method of detecting whether the data traffic between the PPPoA terminal and the Ethernet BAS device, that is, data traffic of the corresponding connection, changes in a set time period may be adopted to determine whether the connection is kept.

The procedure for processing an abnormal logoff of a PPPoA terminal includes the following steps:

Step 701B: the IP DSLAM device detects that the number of the LCP packets or data traffic of the connection does not increase in n continuous periods of set time.

Step 702B: the IP DSLAM device sends a PPPoE logoff packet to the Ethernet BAS device and the Ethernet BAS device removes the PPPoE connection between itself and the IP DSLAM device after receiving the PPPoE logoff packet.

After the PPPoA terminal logs off, the IP DSLAM device can return the MAC address assigned to the PPPoA terminal to the MAC address pool, so as to enable the MAC address to be assigned to other PPPoA terminal. The PPPoA terminal herein includes the PPPoA terminal logged off normally and the PPPoA terminal logged off abnormally.

Figure 8:
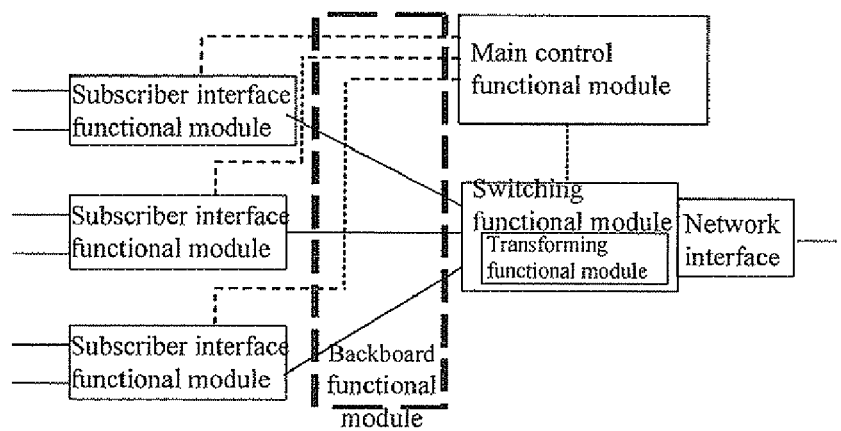
FIG. 8 shows a schematic diagram of the structure of a broadband access device in accordance with an embodiment of the present invention.

FIG. 8 shows a schematic diagram of the structure of a broadband access device in accordance with an embodiment of the present invention. As shown in FIG. 8, the broadband access device includes an main control functional module, a switching functional module, a subscriber interface functional module and a backplane functional module, and further includes a conversion functional module, which is used for receiving packets sent by a terminal or broadband access server such as an Ethernet BAS device and converting a PPPoA packet and a PPPoE packet into each other, that is, used for converting the PPPoA packet sent by a PPPoA terminal into a PPPoE packet and sending the PPPoE packet to the Ethernet BAS device, and used for converting the PPPoE packet sent by an Ethernet BAS device into a PPPoA packet and sending the PPPoA packet to the PPPoA terminal. The conversion functional module, when determining that the received packet sent by a terminal is a PPPoA packet, converts the PPPoA packet into a PPPoE packet and sends the PPPoE packet to the Ethernet BAS device; and after receiving a PPPoE packet sent by the Ethernet BAS device, if determining that the terminal to receive the data in the PPPoE packet is a PPPoA terminal according to the MAC address, the convertsion functional module converts the PPPoE packet into a PPPoA packet and sends the PPPoA packet to the PPPoA terminal. The conversion functional module may be a separate entity, or integrated with the existing switching functional module or the main control functional module.

In an embodiment of the present invention, the conversion functional module is set in the switching functional module of the IP DSLAM device, which enables the IP DSLAM device to perform an automatic conversion between the PPPoA packet and the PPPoE packet and to cooperate with a standard Ethernet BAS device to enable the PPPoA terminal to access a broadband network via the IP DSLAM device. The IP DSLAM device converts the PPPoA packet sent by the PPPoA terminal into the PPPoE packet and sends the PPPoE packet to the Ethernet BAS device, and converts the PPPoE packet sent by the Ethernet BAS device into the PPPoA packet and sends the PPPoA packet to the PPPoA terminal. Additionally, abnormal logoff of the PPPoA terminal can be detected with an effective method in the implementing procedure in accordance with an embodiment of the present invention. The method to detect the abnormal logoff of a PPPoA terminal guarantees inter-working of the protocols. Therefore, the function of PPPoA access can be supported properly on the IP DSLAM device.

Though the present invention has been illustrated and described by referring to some preferred embodiments of the present invention, those skilled in the art should understand that various changes may be made in form and detail without departing from the spirit and the scope of the present invention and therefore should be covered in the protection scope of the present invention defined by the appended claims and its equivalents.

I claim:

1. An accessing method for supporting a Point to Point Protocol over Asynchronous Transfer Mode (PPPoA) terminal to a broadband access device based on an Internet Protocol (IP) architecture, comprising:

assigning, by the broadband access device, a Media Access Control (MAC) address to the PPPoA terminal;

setting up a Point to Point Protocol over Ethernet (PPPoE) connection between the broadband access device and a Broadband Access Server (BAS), and acquiring, by the broadband access device, a Session ID assigned by the BAS;

converting, by the broadband access device, a PPPoA packet sent by the PPPoA terminal into a PPPoE packet and sending the converted PPPoE packet to the BAS; converting, by the broadband access device, a PPPoE packet sent by the BAS into a PPPoA packet and sending the PPPoA packet to the PPPoA terminal, according to the MAC address and the Session ID;

upon detecting a logoff of the PPPoA terminal, the broadband access device instructing the BAS to remove the PPPoE connection;

upon receiving the instruction of removing the PPPoE connection, the BAS removing the PPPoE connection between the BAS and the broadband access device, wherein said detecting a logoff of the PPPoA terminal comprises:

counting the number of keep alive packets between the PPPoA terminal and the BAS within a pre-configured time, and determining whether the number increases, if the number increases, determining that the PPPoA terminal is online; if the number does not increase, determining that the PPPoA terminal has logged off.

2. The method according to claim 1, wherein a MAC address pool is configured for the PPPoA terminal in the broadband access device, said assigning a MAC address to the PPPoA terminal comprises:

assigning, by the broadband access device, a MAC address to the PPPoA terminal from the configured MAC address pool.

3. The method according to claim 2, wherein said assigning a MAC address to the PPPoA terminal comprises:

designating a MAC address for the PPPoA terminal statically, or assigning a MAC address to the PPPoA terminal dynamically.

4. The method according to claim 1, wherein one MAC address corresponds to at least one PPPoA terminal.

5. The method according to claim 1, wherein said converting a PPPoA packet sent by the PPPoA terminal into a PPPoE packet comprises:

terminating the PPPoA packet, analyzing the PPPoA packet to get a PPP load, generating a PPPoE packet header according to the Session ID, PPP load length and related information, and encapsulating the PPPoE packet header and the PPP load into the PPPoE packet.

6. The method according to claim 1, wherein said converting a PPPoE packet sent by the BAS into a PPPoA packet comprises:

analyzing the PPPoE packet to get the PPP load, regenerating a Permanent Virtual Circuit (PVC), a port number and a slot number corresponding to the PPPoA terminal according to the Session ID, the MAC address and a Virtual Local Area Network (VLAN) identifier in the PPPoE packet, and encapsulating the PPP load and the related information into the PPPoA packet.

7. The method according to claim 6, wherein the broadband access device determines that the terminal is a PPPoA terminal according to the MAC address or the VLAN identifier.

8. The method according to claim 1, wherein if one MAC address corresponds to one PPPoA terminal, said sending the PPPoA packet to the PPPoA terminal comprises:

sending the PPPoA packet to the PPPoA terminal corresponding to the MAC address;

if one MAC address corresponds to more than one PPPoA terminal, said sending the PPPoA packet to the PPPoA terminal comprises:

sending the PPPoA packet to the PPPoA terminal corresponding to the MAC address and the Session ID or corresponding to the Session ID.

9. The method according to claim 1, further comprising:

upon receiving a logoff request sent by the PPPoA terminal, sending the logoff request, the broadband access device;

removing a PPP connection between the BAS and the PPPoA terminal as well as the PPPoE connection between the BAS and the broadband access device, by the BAS.

10. The method according to claim 9, wherein after the broadband access device sends the logoff request to the BAS, the broadband access device returns the MAC address assigned to the PPPoA terminal to the MAC address pool.

11. The method according to Claim 1, wherein after the broadband access device instructs the BAS to remove the PPPoE connection, the broadband access device returns the MAC address assigned to the PPPoA terminal to the MAC address pool.

12. An accessing device for supporting a Point to Point Protocol over Asynchronous Transfer Mode (PPPoA) terminal, comprising:

a main control functional hardware module, a switching functional hardware module, a subscriber interface functional hardware module and a backplane functional hardware module, and a conversion functional hardware module, used for converting a PPPoA packet sent by a PPPoA terminal into a Point to Point Protocol over Ethernet (PPPoE) packet and sending the PPPoE packet to an Ethernet Broadband Access Server (BAS) device, as well as converting a PPPoE packet sent by an Ethernet BAS device into a PPPoA packet and sending the PPPoA packet to a PPPoA terminal;

upon detecting a logoff of the PPPoA terminal, the broadband access device instructing the BAS to remove the PPPoE connection;

wherein said detecting a logoff of the PPPoA terminal comprises:

counting the number of keep alive packets between the PPPoA terminal and the BAS within a pre-configured time, and determining whether the number increases, if the number increases, determining that the PPPoA terminal is online; if the number does not increase, determining that the PPPoA terminal has logged off.

13. An accessing system for supporting a Point to Point Protocol over Asynchronous Transfer Mode (PPPoA) terminal, comprises an Internet Protocol (IP) architecture based broadband access device and a Broadband Access Server (BAS);

the broadband access device is used for assigning a Media Access Control (MAC) address to a PPPoA terminal, setting up a Point to Point Protocol over Ethernet (PPPoE) connection between the BAS and itself, converting a PPPoA packet sent by the PPPoA terminal into a PPPoE packet and sending the converted PPPoE packet to the BAS, and converting a PPPoE packet sent by the BAS into a PPPoA packet and sending the PPPoA packet to the PPPoA terminal, according to the MAC address and a session ID; counting the number of keep alive packets between the PPPoA terminal and the BAS within a pre-configured time, and determining whether the number increases, if the number increases, determining that the PPPoA terminal is online; if the number does not increase, determining that the PPPoA terminal has logged off; upon detecting a logoff of the PPPoA terminal, the broadband access device instructing the BAS to remove the PPPoE connection;

the BAS is used for assigning the session ID to the broadband access device, upon receiving the instruction of removing the PPPoE connection, the BAS removing the PPPoE connection between the BAS and the broadband access device.

14. The system according to claim 13, wherein the broadband access device terminates the PPPoA packet, analyzes the PPPoA packet to get a PPP load, generates a PPPoE packet header according to the Session ID, PPP load length and related information, and encapsulates the PPPoE packet header and the PPP load into the PPPoE packet.

15. The system according to claim 13, wherein, the broadband access device analyzes the PPPoE packet to get a PPP load, regenerates a Permanent Virtual Circuit (PVC), a port number and a slot number corresponding to the PPPoA terminal according to the Session ID, the MAC address and a Virtual Local Area Network (VLAN) identifier in the PPPoE packet, and encapsulates the PPP load and the related information into the PPPoA packet.

16. The system according to claim 13, wherein the broadband access device is further used for sending a notification of removing the PPPoE connection between the broadband access device and the BAS when detecting a logoff of the PPPoA terminal.

17. The system according to claim 13, wherein the BAS is further used for removing the PPPoE connection between the BAS and the broadband access device after receiving the notification of removing the PPPoE connection from the broadband access device.

* * * * *